US008149776B2

(12) United States Patent
Steudle et al.

(10) Patent No.: US 8,149,776 B2
(45) Date of Patent: Apr. 3, 2012

(54) METHOD, APPARATUS AND COMPUTER PROGRAM FOR USER EQUIPMENT ACCESS CHANNEL PROCEDURES

(75) Inventors: Ville O. Steudle, Turku (FI); Juho Mikko Oskari Pirskanen, Tampere (FI); Ladislav Kusnyer, Salo (FI); Sami P. Hakala, Oulu (FI); Jukka T. Vikstedt, Oulu (FI); Harri Matti Johannes Valio, Kammenniemi (FI); Markku Juhani Tarkiainen, Oulu (FI)

(73) Assignee: Nokia Corporation, Espoo (FI)

( * ) Notice: Subject to any disclaimer, the term of this patent is extended or adjusted under 35 U.S.C. 154(b) by 499 days.

(21) Appl. No.: 12/454,053

(22) Filed: May 12, 2009

(65) Prior Publication Data

US 2010/0290408 A1    Nov. 18, 2010

(51) Int. Cl.
 H04W 4/00    (2009.01)
 H04B 7/216    (2006.01)
 H04B 7/00    (2006.01)

(52) U.S. Cl. ........ 370/329; 370/335; 370/342; 375/145; 455/522

(58) Field of Classification Search .......... 370/230–278, 370/320–342, 491; 375/145, 146, E1.008; 713/320; 455/13.4, 69, 127.5, 517, 522
See application file for complete search history.

(56) References Cited

U.S. PATENT DOCUMENTS

| 7,117,004 | B2 | 10/2006 | Ozluturk et al. | 455/522 |
| 7,126,930 | B2* | 10/2006 | Pankaj et al. | 370/335 |
| 7,190,966 | B2 | 3/2007 | Ozluturk et al. | 455/522 |
| 7,286,847 | B2 | 10/2007 | Ozluturk et al. | 455/522 |
| 7,586,865 | B2* | 9/2009 | Ostman et al. | 370/318 |
| 2004/0233870 | A1* | 11/2004 | Willenegger et al. | 370/329 |
| 2010/0260132 | A1* | 10/2010 | Rao | 370/329 |
| 2010/0309877 | A1* | 12/2010 | Damnjanovic et al. | 370/331 |

OTHER PUBLICATIONS

3GPP TS 25.331 V8.2.0 (Mar. 2008), 3$^{rd}$ Generation Partnership Project; Technical Specification Group Radio Access Network; Radio Resource Control (RRC); Protocol Specification (Release 8), pp. 1-31, p. 285-286, p. 717-720.

3GPP TS 25.211 V8.0.0 (Mar. 2008), 3$^{rd}$ Generation Partnership Project; Technical Specification Group Radio Access Network; Physical Channels and Mapping of Transport Channels onto Physical Channels (FDD) (Release 8), pp. 1-54.

3GPP TS 25.214 V8.1.0 (Mar. 2008), 3$^{rd}$ Generation Partnership Project; Technical Specification Group Radio Access Network; Physical Layer Procedures (FDD) (Release 8), pp. 1-87.

\* cited by examiner

Primary Examiner — Afsar M. Qureshi
(74) Attorney, Agent, or Firm — Harrington & Smith

(57) ABSTRACT

Access to a wireless network is attempted by sending on a random access channel RACH at a first transmit power a first preamble comprising a signature sequence that is randomly selected from a set of signature sequences. After the access attempt from sending the first preamble is determined unsuccessful, access to the wireless network is re-attempted by sending on the RACH at a second transmit power a second preamble comprising a signature sequence, in which the second transmit power is no greater than the first transmit power. Embodiments variously combine different options: the signature sequences of the first and second preambles are each randomly selected separately, or the signature sequence of the first preamble is re-used in the second preamble; the first and second transmit powers are each equal to an initial transmit power, or the second transmit power is the initial power and less than the first transmit power.

20 Claims, 7 Drawing Sheets

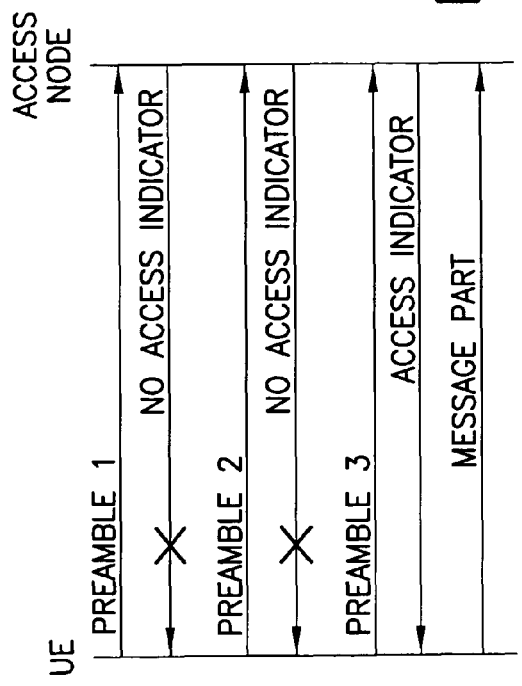
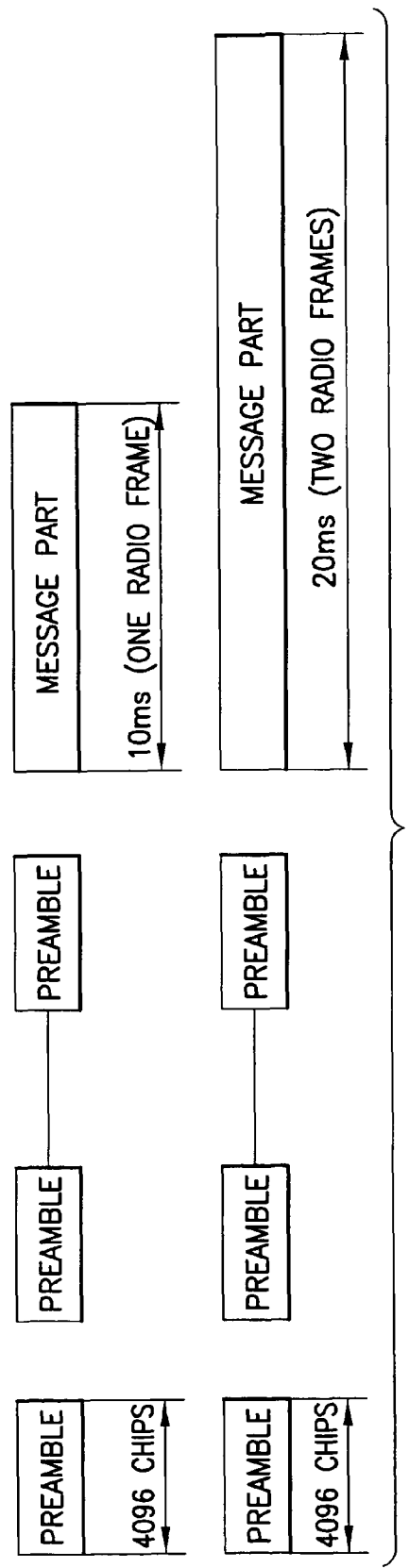

| | 1st RACH ACCESS ATTEMPT | | | 2nd RACH ACCESS ATTEMPT | | |
|---|---|---|---|---|---|---|
| | 1st PREAMBLE | 2nd PREAMBLE | 3rd PREAMBLE | 1st PREAMBLE | 2nd PREAMBLE | 3rd PREAMBLE |
| 1st & 2nd EMBODIMENTS | RANDOMLY SELECT SEQUENCE | RANDOMLY SELECT SEQUENCE | RANDOMLY SELECT SEQUENCE | RANDOMLY SELECT SEQUENCE | RANDOMLY SELECT SEQUENCE | RANDOMLY SELECT SEQUENCE |
| 3rd & 4th EMBODIMENTS | RANDOMLY SELECT SEQUENCE | RE-USE SAME SEQUENCE FROM 1st PREAMBLE OF 1st RACH ACCESS ATTEMPT | RE-USE SAME SEQUENCE FROM 1st PREAMBLE OF 1st RACH ACCESS ATTEMPT | RANDOMLY SELECT SEQUENCE | RE-USE SAME SEQUENCE FROM 1st PREAMBLE OF 2nd RACH ACCESS ATTEMPT | RE-USE SAME SEQUENCE FROM 1st PREAMBLE OF 2nd RACH ACCESS ATTEMPT |
| 1st & 3rd EMBODIMENTS | INITIAL POWER ($P_{init}$) | INITIAL POWER ($P_{init}$) | INITIAL POWER+1 STEP INCREASE ($P_{init}+P_0$) | INITIAL POWER ($P_{init}$) | INITIAL POWER ($P_{init}$) | INITIAL POWER+1 STEP INCREASE ($P_{init}+P_0$) |
| 2nd & 4th EMBODIMENTS | INITIAL POWER+1 STEP INCREASE ($P_{init}+P_0$) | INITIAL POWER ($P_{init}$) | INITIAL POWER+ GREATER THAN 1 STEP INCREASE ($P_{init}+P_0+x$) | INITIAL POWER+1 STEP INCREASE ($P_{init}+P_0$) | INITIAL POWER ($P_{init}$) | INITIAL POWER+ GREATER THAN 1 STEP INCREASE ($P_{init}+P_0+x$) |

FIG.3

METHOD, APPARATUS AND COMPUTER PROGRAM FOR USER EQUIPMENT ACCESS CHANNEL PROCEDURES

TECHNICAL FIELD

The exemplary and non-limiting embodiments of this invention relate generally to wireless communication systems, methods, devices and computer programs and, more specifically, relate to access procedures by which a user equipment accesses a wireless network.

BACKGROUND

Various abbreviations that appear in the specification and/or in the drawing figures are defined as follows:

| | |
|---|---|
| 3GPP | third generation partnership project |
| AI/AICH | acquisition indicator/acquisition indicator channel |
| CAZAC | constant amplitude zero autocorrelation (e.g., Zadoff-Chu sequence) |
| DL | downlink |
| EUTRAN | evolved UTRAN (also referred to as LTE or 3.9G) |
| GSM | global system for mobile telecommunications |
| LTE | long term evolution |
| MME | mobility management entity |
| Node B | base station |
| PC | power control |
| PRACH | physical random access channel |
| RACH | random access channel |
| UE | user equipment |
| UL | uplink |
| UTRAN | universal terrestrial radio access network |
| WCDMA | wideband code division multiple access |

The following 3GPP specifications are relevant to these teachings:
- TS 25.211, v8.4.0 (2009-03) Physical channels and mapping of transport channels onto physical channels (RACH at section 4.1.2.4; PRACH at section 5.2.2.1; and AICH at section 5.3.3.7);
- TS 25.214, v8.5.0 (2009-03) Physical layer procedures (PRACH at section 5.1.1; and physical random access procedures at section 6.1);
- TS 25.331, V8.2.0 (2008-03) Radio Resource Control (PRACH selection at section 8.5.17).

Similar teachings for E-UTRA are in technical specifications (TS) bearing a leading 36 series number.

As an overview and example of network access procedures for the WCDMA system, reference is made to FIGS. 1A and 1B, of which FIG. 1B is reproduced from FIG. 4 of 3GPP TS 25.211 (v 8.0.0) at section 5.2.2.1.1. Briefly, the UE seeking access to the system transmits on a RACH a first preamble to an access node (base station) and listens on an acquisition indicator channel AICH for a corresponding acquisition indicator AI. If that AI is not received, the UE tries again by transmitting a second preamble and again listens for a corresponding AI. In the example, this continues a third time, at which FIG. 1A shows that an AI corresponding to the third preamble is received by the UE. Only after receiving that AI does the UE then transmit what is termed the message part of its access message. The preambles and message parts are shown also at FIG. 1B. Generally, each of those three preambles uses a signature sequence that the UE randomly generates for each of the different preambles. This avoids different UEs attempting access over the same RACH from reading the AI from the other UE, since the AI is mapped to the signature sequence used in the preamble to which the AI corresponds. While the example shows three preambles, this is not to be seen limiting, and there can be one up to a network-configured maximum number of preambles, depending on channel conditions.

In general, the transmit power that the UE uses on the PRACH for the first preamble is set by higher layers. As currently set forth in 3GPP TS 25.214 at section 6.1, the UE randomly selects a signature set (e.g., a CAZAC sequence for LTE-specific implementations) and sets the transmit power for its initial access attempt on the PRACH to a commanded preamble power set by higher layers (shown as $P_{init}$ at FIG. 2). If the UE finds no positive or negative acquisition indicator on the AICH that corresponds to the slot at which the UE sent its first preamble on the PRACH at power $P_{init}$, the UE then randomly selects another signature sequence and as shown at FIG. 2 re-attempts access using an increased power, where the increase is given as a power ramp step $P_0$. The UE continues these transmissions, repeatedly using a different sequence and increasing transmit power by the ramp step until either it finds the acquisition indicator at the corresponding slot of the AICH or its counter hits a maximum, which may or may not be three as in this example. Once the UE receives its acquisition indicator on the AICH, then as can be seen at FIG. 2 the UE can send the message part of the PRACH.

There are several problems seen with the above approach. As seen at FIG. 2, when the first preamble does not result in the acquisition indicator being received at the UE, the UE must repeat the process with new signature sequence and increased power $P_{init}+P_0$. If there is a reception problem at the BS, or if there is interference in the first-sent preamble, then the second-sent preamble represents needless power consumption at the UE, which is a consideration with portable electronic devices. Also with the second-sent preamble there is an added computational complexity for the UE which needs to map the randomly generated sequence used in each preamble to the corresponding slot in the AICH at which the UE looks for its acquisition indicator. These teachings are directed toward addressing at least some of the above concerns.

SUMMARY

In accordance with one example embodiment of the invention is a method that includes attempting access to a wireless network by sending from a transmitter on a random access channel at a first transmit power a first preamble comprising a signature sequence that is randomly selected from a set of signature sequences; and responsive to determining that the access attempt from sending the first preamble was unsuccessful, re-attempting access to the wireless network by sending from the transmitter on the random access channel at a second transmit power a second preamble comprising a signature sequence, in which the second transmit power is no greater than the first transmit power.

In accordance with another example embodiment of the invention is an apparatus that includes a processor and a transmitter. The transmitter is configured to attempt access to a wireless network by sending on a random access channel at a first transmit power a first preamble comprising a signature sequence that is randomly selected from a set of signature sequences. The processor is configured to determine that the access attempt from the first preamble was unsuccessful, and responsive to that determining, the processor is configured to cause the transmitter to re-attempt access to the wireless network by causing the transmitter to send on the random access channel at a second transmit power a second preamble comprising a signature sequence, in which the second transmit power is no greater than the first transmit power.

In accordance with yet another example embodiment of the invention is a computer readable memory storing a program of instructions that when executed by a processor result in actions that comprise: attempting access to a wireless network by sending on a random access channel at a first transmit power a first preamble comprising a signature sequence that is randomly selected from a set of signature sequences; and responsive to determining that the access attempt from sending the first preamble was unsuccessful, re-attempting access to the wireless network by sending on the random access channel at a second transmit power a second preamble comprising a signature sequence, in which the second transmit power is no greater than the first transmit power.

In accordance with still another example embodiment of the invention is an apparatus that includes processing means and a sending means. The sending means is for attempting access to a wireless network by transmitting, on a random access channel at a first transmit power, a first preamble comprising a signature sequence, which the processing means randomly selects from a set of signature sequences. The processing means is also for determining that the access attempt from the first preamble was unsuccessful, and responsive to that determining is for causing the sending means to re-attempt access to the wireless network by causing it to transmit on the random access channel at a second transmit power a second preamble comprising a signature sequence, in which the second transmit power is no greater than the first transmit power. In a specific exemplary embodiment, the processing means comprises at least one processor, the sending means comprises a transmitter, and the apparatus comprises a portable handheld user equipment.

These and other aspects are detailed below with more particularity.

BRIEF DESCRIPTION OF THE DRAWINGS

The foregoing and other aspects of the exemplary embodiments of this invention are made more evident in the following Detailed Description, when read in conjunction with the attached Drawing Figures.

FIG. 1A is a signalling diagram representing initial network access by a UE in a WCDMA system showing three preamble transmissions before the user equipment receives an acquisition indicator.

FIG. 1B reproduces FIG. 4 from section 5.2.2.1.1 of 3GPP TS 25.211 (ver 8.0.0), Overall structure of random-access transmission.

FIG. 3 is a table of sequence selection and power control for PRACH preamble transmissions according to four exemplary and non-limiting embodiments of the invention.

DETAILED DESCRIPTION

Figure 2:
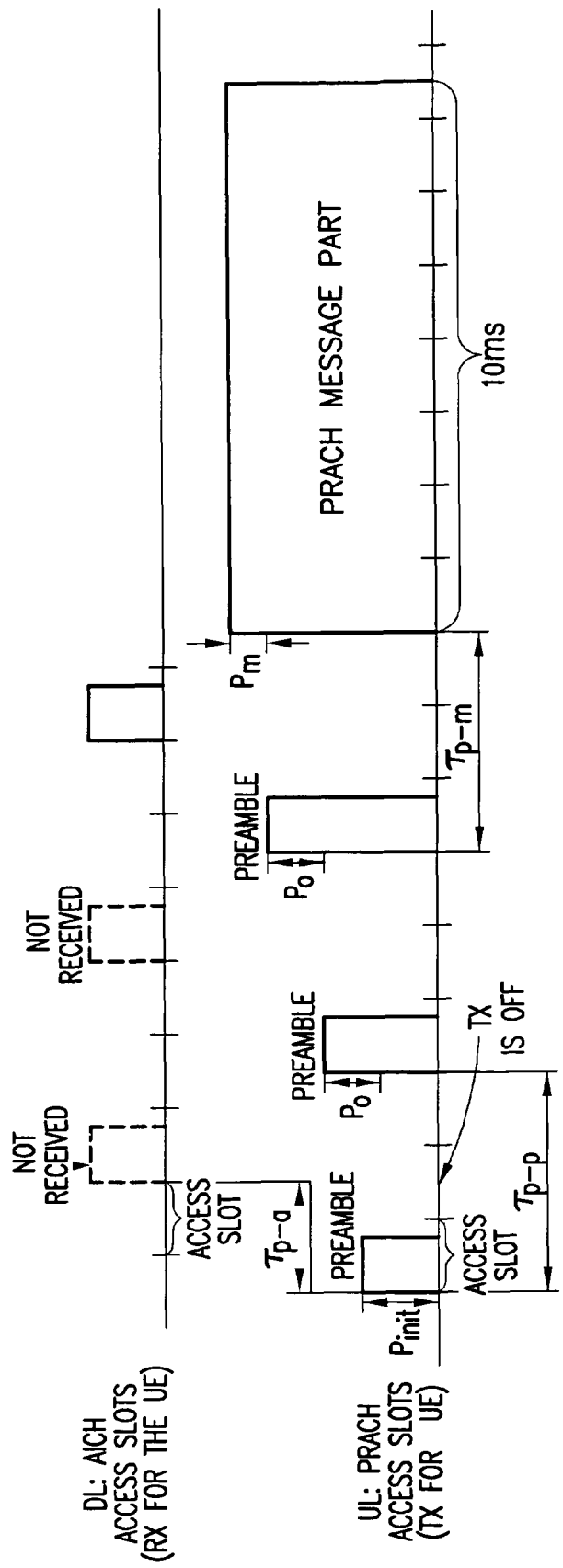
FIG. 2 is a schematic diagram of a prior art PRACH/AICH exchange when first and second access attempts fail and an acquisition indicator is received only after a third access attempt by the UE.

In the specific examples given below are several approaches to resolving the problem of no access from an initial transmission by the UE of its preamble transmission on the PRACH. They may be used singly or in various combinations, and are summarized as follows:

The initial access attempt on PRACH is at a transmit power increased over the initial power indicated by higher layers (e.g., at $P_{init}+P_0$ instead of at $P_{init}$).

The signature sequence(s) used for subsequent access attempts after the first access attempt are statically assigned rather than randomly selected by the UE.

Relevant to the first point above, the inventors have determined that too often the UE's first access attempt is unsuccessful, so increasing the power at which that initial PRACH access attempt over the power indicated by higher layers $P_{init}$ should improve the success rate. It is still possible that in some instances that initial access attempt may be unsuccessful. In that case, any second attempt by the UE at network access that may be necessary is, according to certain exemplary embodiments of the invention, at a transmit power that is no greater than the initial access attempt. Specifically in the second and fourth embodiments detailed below, the UE's transmit power for the second preamble is less than the UE's transmit power for the first preamble.

Relevant to the second point above, in certain exemplary embodiments the UE randomly generates a signature sequence as normal for the first preamble transmission, and in the event the UE needs to send another preamble transmission because it did not see an acquisition indicator at the mapped portion of the AICH, the UE then re-uses the signature sequence it previously generated which was already used in the first preamble transmission.

Various combinations of those two points above lead to four different embodiments for the first two PRACH attempts. These are exemplary and non-limiting; other variations will be readily apparent within these teachings. In a first exemplary embodiment, the signature sequences for each of the first and second access attempt is random and the power for the first and second access attempt is the same at $P_{init}$. In a second exemplary embodiment, the signature sequences for each of the first and second access attempt is random and the power for the first access attempt is higher than the initial power indicated by higher layers (e.g., $P_{init}+P_0$) while the power for the second access attempt is lower, say for example at the initial power indicated by higher layers $P_{init}$. In a third exemplary embodiment, the signature sequences for the first access attempt is random and signature sequence for the second access attempt repeats that of the first access attempt, while the power for both the first and second access attempts is the same, say for example at the initial power indicated by higher layers $P_{init}$. In a exemplary fourth embodiment, the signature sequences for the first access attempt is random and signature sequence for the second access attempt repeats that of the first access attempt, while the power for the first access attempt is higher than the initial power indicated by higher layers (e.g., $P_{init}+P_0$) and the power for the second access attempt is lower (e.g., $P_{init}$).

These four can be generalized as follows: the UE attempts access to a wireless network by sending, on the random access channel at a first transmit power, a first preamble that comprises a signature sequence that is randomly generated (e.g., randomly selected from a pre-determined set of signature sequences). Responsive to the UE determining that the access attempt from sending the first preamble was unsuccessful (where the determining is for example the UE failing to find an AI in a slot of the AICH that is mapped by the sent first preamble), the UE re-attempts access to the wireless network by sending, again on the random access channel but this time at a second transmit power, a second preamble that comprises a signature sequence. But in this case the second transmit power is no greater than the first transmit power. For the first and second embodiments above, the signature sequence of the first preamble and the signature sequence of the second preamble are each randomly generated. For the third and fourth embodiments above, the signature sequence for the first preamble is randomly generated and the signature sequence for the second preamble is the same as the signature sequence for the first preamble, re-used in the second preamble.

As compared to the prior art, each of those four embodiments decrease interference caused by the second preamble. Additionally, the second embodiment also increases the likelihood that the Node B will correctly receive the first PRACH access attempt. Further, the third and fourth embodiments also reduce computation complexity by the UE since it does not need to randomly generate another signature sequence for the second PRACH attempt. Like the second embodiment, the fourth embodiment also increases the likelihood that the Node B will correctly receive the first PRACH access attempt. For this reason the fourth embodiment is considered at this time to be the best mode.

These four exemplary and non-limiting embodiments are set forth in tabular form at FIG. 3. With respect to FIG. 3, assume that UE has a counter that limits the number of preambles sent in each RACH access attempt to three, and these are termed the initial preamble (corresponding to the leftmost preamble of FIG. 2 which as indicated there is sent with power $P_{init}$), the second preamble (corresponding to the centremost preamble of FIG. 2) and the third preamble (corresponding to the rightmost preamble of FIG. 2). Of course the UE's counter may go to any integer maximum greater than zero, but we use three as the limit for this example. Each preamble that the UE sends on the PRACH increments the counter by one. Each time the counter reaches its maximum is one RACH attempt. At the end of each RACH attempt, or when an AI is received on time, the UE re-sets its counter to zero. If the UE has not yet received the AI and therefore has not acquired access to the network once the counter hits its maximum, the UE can then re-attempt access in a second RACH attempt, incrementing the counter again for each preamble it sends in the second RACH attempt. FIG. 3 illustrates by way of example two distinct RACH access attempts, where the UE begins the second RACH access attempt after failing to obtain the acquisition indicator following any of the three preamble transmissions of the first RACH access attempt, re-sets its counter, and begins the RACH process anew.

Excluding column titles, the first two rows of FIG. 3 illustrate the signature sequence which the UE puts in the various preambles according to the four exemplary embodiments noted above, and the last two rows illustrate the power at which the UE transmits those preambles according to those same four exemplary embodiments.

At the first row of FIG. 3 and for the first RACH access attempt, according to the first and second embodiments the UE randomly selects a signature sequence and transmits a first preamble that has the randomly generated/selected signature sequence on the RACH. If in response the UE fails to obtain the acquisition indicator (e.g., it does not correctly receive an AI on the slot of the AICH which is mapped by the first preamble), then the UE randomly generates/selects another signature sequence for the second preamble that it transmits on the RACH. If again the UE fails to receive in response the acquisition indicator it expects on the AICH, then the UE randomly generates/selects still another signature sequence for the third preamble that it transmits on the RACH. At this point the UE's RACH counter is at its upper limit of three. Should the UE choose to re-attempt RACH access further, then the second RACH access attempt repeats just as the first RACH access attempt, by which the UE randomly selects a signature sequence for each preamble transmission of the second RACH attempt.

At the second row of FIG. 3, and for the first RACH access attempt, according to the third and fourth embodiments the UE randomly selects a signature sequence and transmits a first preamble that has the randomly generated/selected signature sequence on the RACH. This is the same as the first and second embodiments. But in the third and fourth embodiments, the UE re-uses the same sequence from the first preamble of the RACH access attempt. Note at FIG. 3 for the third and fourth embodiments that for the first preamble in the second RACH access attempt, the UE generates anew another signature sequence different from that used in the first RACH access attempt. Re-use of the same signature sequence for subsequent preambles within the same RACH access attempt avoids the need for the UE to expend processing power on dynamically re-generating signature sequences for the second and third preambles.

According to these third and fourth embodiments, the UE maps the first randomly generated signature sequence of the first preamble to a particular slot on the AICH. The UE stores this mapping it its local memory. If the UE does not find an AI for it at the mapped slot, then by re-using the same signature sequence in the second (and third) RACH preambles it need only read its previously stored mapping to find the correct AICH slot in which to look, and need not independently map each preamble's signature sequence independently to the AICH.

Note that in both mapping and re-using the same signature sequence, the sequences for all three preambles of a RACH access attempt are known at the start of the RACH access attempt (defined by the UE's counter). In this manner the signature sequences for all but the first preamble of any RACH access attempt are statically determined, as compared to the prior art in which they are randomly generated as they are needed for the upcoming preamble transmission.

The two lowermost rows of the table at FIG. 3 tabulate the power control aspects of the above exemplary embodiments of the invention. As noted above these may be combined with the signature sequence aspects of the invention or employed separately therefrom. As a review of the prior art shown at FIG. 2 and as detailed in the background section above, for the initial preamble transmission during the first RACH access attempt, the UE sets its transmit power for the first preamble according to $P_{init}$ which is an initial power level for random access to the network and which is obtained from higher layers. Further as noted for FIG. 2, for each subsequent preamble transmission while the UE's counter is not yet expired the UE increases it preamble transmit power one ramp step ($P_0$ in FIG. 2 which is also broadcast in system information) as compared to the last preamble transmission. If that prior art UE chooses to re-attempt another RACH access attempt after its counter tops out, it re-sets the counter and begins again as with the first RACH access attempt where the first preamble of the second RACH attempt is again transmitted at the commanded power $P_{init}$.

The initial power level is obtained from higher layers, in one particular embodiment, by exchanging the parameters between the radio resource control RRC logical layer of the eNB and the RRC layer of the UE. Bits signalled between the network and the UE are on the physical layer. Consider those bits the power value which the UE receives by example in system information from the network. The RRC layer of the eNB uses $P_{init}$ to find that power value which it sends on the physical layer, and the RRC layer of the UE finds $P_{init}$ for its own use using the power value which it receives on the physical layer. Thus $P_{init}$ is obtained from the RRC layers of the eNB and the UE. In an embodiment it is this computed power $P_{init}$, which the UE gets from its RRC layer, that is the transmit power for the second preamble for all embodiments at FIG. 3 and that is the transmit power for the first preamble of the $1^{st}$ and $3^{rd}$ embodiments at FIG. 3. Note also that the same higher layer can compute the transmit power $P_{init}+P_0$ for the first preamble for the $2^{nd}$ and $4^{th}$ embodiments of FIG. 3. As a specific example, consider that the value signaled by the network in its system information and received at the UE's receiver is Primary CPICH TX power. The network may also signal other relevant parameters, such as uplink UL interference and some constant value, for example. The UE receives those three signaled values, it may further measure the channel to arrive at its own measured parameter, and computes $P_{init}$ from those signaled and measured parameters. Specifically, the formula used at the UE's RRC layer may be, for example: $P_{init}$=(Primary CPICH power)−(CPICH_RSCP)+(UL interference)+(Constant Value); where CPICH_RSCP represents the UE's own measurement.

One non-limiting embodiment of this aspect of the invention shown by way of example at the last row of FIG. 3 takes a different approach so as to better avoid the case where the preamble transmitted with the initial power $P_{init}$ yields no resulting acquisition indicator on the AICH. Specifically, according to the second and fourth exemplary embodiments of the invention, for the first preamble the UE sets its transmit power at $P_{init}+P_0$; one power step $P_0$ above the initial preamble power $P_{init}$ indicated by higher layers. Recall that the PRACH message part (right side of FIGS. 1B and 2) is transmitted at a power that is increased over the power used on the most recent preamble transmission (which resulted in the acquisition indicator on the AICH) by the power offset $P_m$ set by higher layers. In a variation of the second and fourth embodiments particularly shown at FIG. 3, the second preamble is sent with a transmit power that is lower than that of the first preamble for the same RACH access attempt (e.g., transmit power for the second preamble is reduced by a power step size $P_0$ as compared to the transmit power for the first preamble). Also as shown at FIG. 3, the transmit power for the third preamble is greater than both the first preamble and the second preamble, and in an exemplary embodiment the increase is in increments of the commanded step size (e.g., $P_{init}+P_0+x=P_{init}+2P_0$). In other variations of the second and fourth embodiments not shown at FIG. 3, the second and third preamble transmissions are at the same power as would be generated by the prior art; namely, $P_{init}+P_0$, and $P_{init}+P_0+P_0$. Note that the result is that the first and second preamble transmissions of each RACH access are then at the same power: $P_{init}+P_0$.

For the case where the UE is unsuccessful in obtaining an acquisition indicator on the AICH during the first RACH access attempt, FIG. 3 also shows that the power control aspects of the second and fourth embodiments continue in the second RACH access attempt as the first; the UE re-sets its counter and sends the first (and the second if needed) preamble transmission at one power step above the initial power.

If the third preamble is necessary after the second preamble is transmitted, the UE increases the power used on the final (third) preamble of a RACH access attempt by more than one additional power step over that used in the second-last (second) preamble, so that transmit power on the final preamble exceeds transmit power on every other preamble of that same RACH access attempt. This makes it more likely the BS will receive the UE's third preamble and send an AI in response, thereby helping prevent the UE having to begin a whole new RACH access attempt.

There is a slight increased risk such as when path loss is very low (e.g., UE very near the base station) that this initial preamble transmission will render other RACH preamble transmissions from other UEs unreadable by the base station, but this is seen to be quite slight in view of other separation factors already established in the RACH slot and sequence selection for contention based access. Further, to the extent it does happen, the UE power savings to any random UE is seen to be a net positive over time, since it is anticipated that there will be more instances of this technique eliminating the need for the UE to send a second RACH preamble than there will be that the UE would have to send a second RACH preamble due to its first RACH preamble being overpowered by another UE using the same procedure.

Also at FIG. 3 at the second to last row is the power control profile for the preambles according to the first and third embodiments. Like the prior art, the first preamble is sent at the power commanded by the network, $P_{init}$. However in these exemplary embodiments the power at which the UE sends its second preamble (within a same RACH access attempt) is the same as that used to send the first preamble, $P_{init}$. In these exemplary embodiments, all preambles of a RACH access attempt are sent at a same power, except for the last preamble (e.g., tracked by the UE's counter) which is sent at a higher transmit power. In the specific example at FIG. 3, the last preamble is sent at a power increased one network-directed step size over the network-commanded initial power.

Figure 4:
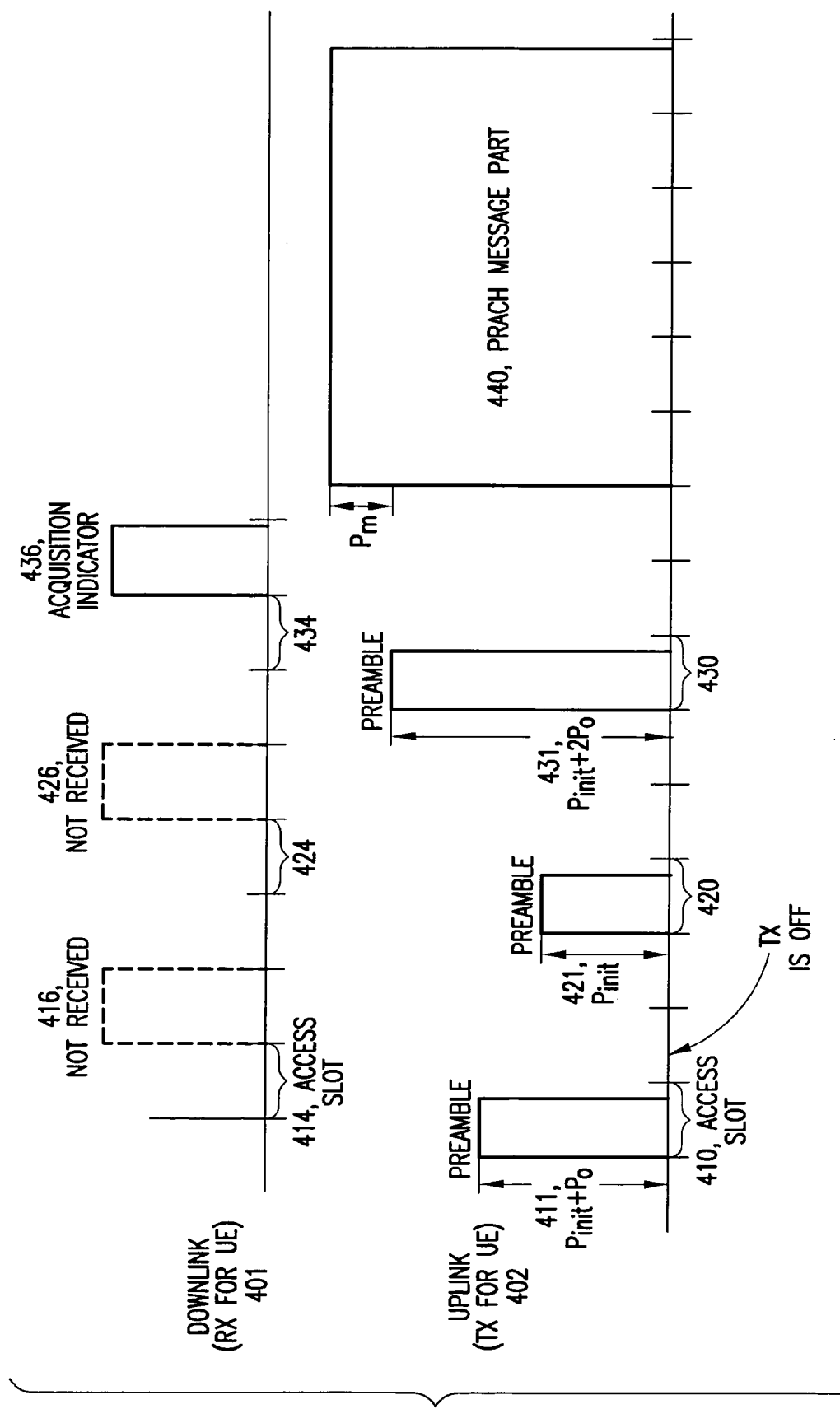
FIG. 4 is a schematic diagram similar in form to FIG. 2 but showing transmit power for the PRACH preambles according to the second and fourth embodiments of FIG. 4.

FIG. 4 illustrates schematically, similar in form to FIG. 2, the power profile according to the second and fourth embodiments of the invention, shown at the last row of FIG. 3. The upper diagram illustrates the AICH 401 which is downlink and received at the UE, and the lower diagram illustrates the PRACH 402 which is uplink and transmitted by the UE. Time progresses left to right, and so at FIG. 4 a UE sends in a first access slot 410 of a PRACH 402 a first preamble 412 at a first transmit power 411. The first preamble has a signature sequence. The UE maps the first preamble to a first access slot 414 of the AICH 401 and tunes its receiver according to the mapping. At 416 the UE determines that the access attempt from sending the first preamble has failed because the UE has not correctly received an AI at the mapped access slot 414. Responsive to this determining, the UE re-attempts access to the wireless network by sending on the RACH 402 at a second transmit power 421 a second preamble 420 comprising a signature sequence, in which the second transmit power 421 is no greater than the first transmit power 411. The specific embodiment of FIG. 4 shows the second transmit power 421 the second transmit power is an initial power $P_{init}$ indicated by the higher layers for random access and the first transmit power 411 is greater than the second transmit power 421 by one network-indicated step size $P_0$.

Further at FIG. 4, the UE maps the second preamble 420 to a second access slot 424 of the AICH 401 and tunes its receiver according to the mapping. For the case of the third and fourth embodiments in which the signature sequence is re-used in each preamble of the same RACH access attempt, the mapping is simply retrieved from the memory after being stored there from the first preamble process. At 426 the UE determines that the access re-attempt from sending the second preamble 420 has failed because the UE has not correctly received an AI at the mapped access slot 424. Responsive to this determining, the UE again re-attempts access to the wireless network by sending on the random access channel 402 at a third transmit power 431 a third preamble 430 comprising a signature sequence, in which the third transmit power 431 is greater than the first transmit power 411 and greater than the second transmit power 421.

The UE maps the third preamble 430 to a third access slot 434 of the AICH 401 and tunes its receiver according to the mapping (as above, the mapping may be retrieved from a local UE memory according to certain embodiments). At 436 the UE correctly receives on the AICH 401 an AI at the mapped access slot 434, and in response sends a PRACH message part 440 at a transmit power increased by $P_m$ over the transmit power used for the most recently transmitted preamble, which in this example is the third preamble 430. The value of $P_m$ is also given by the network in broadcast system information.

Figure 5:
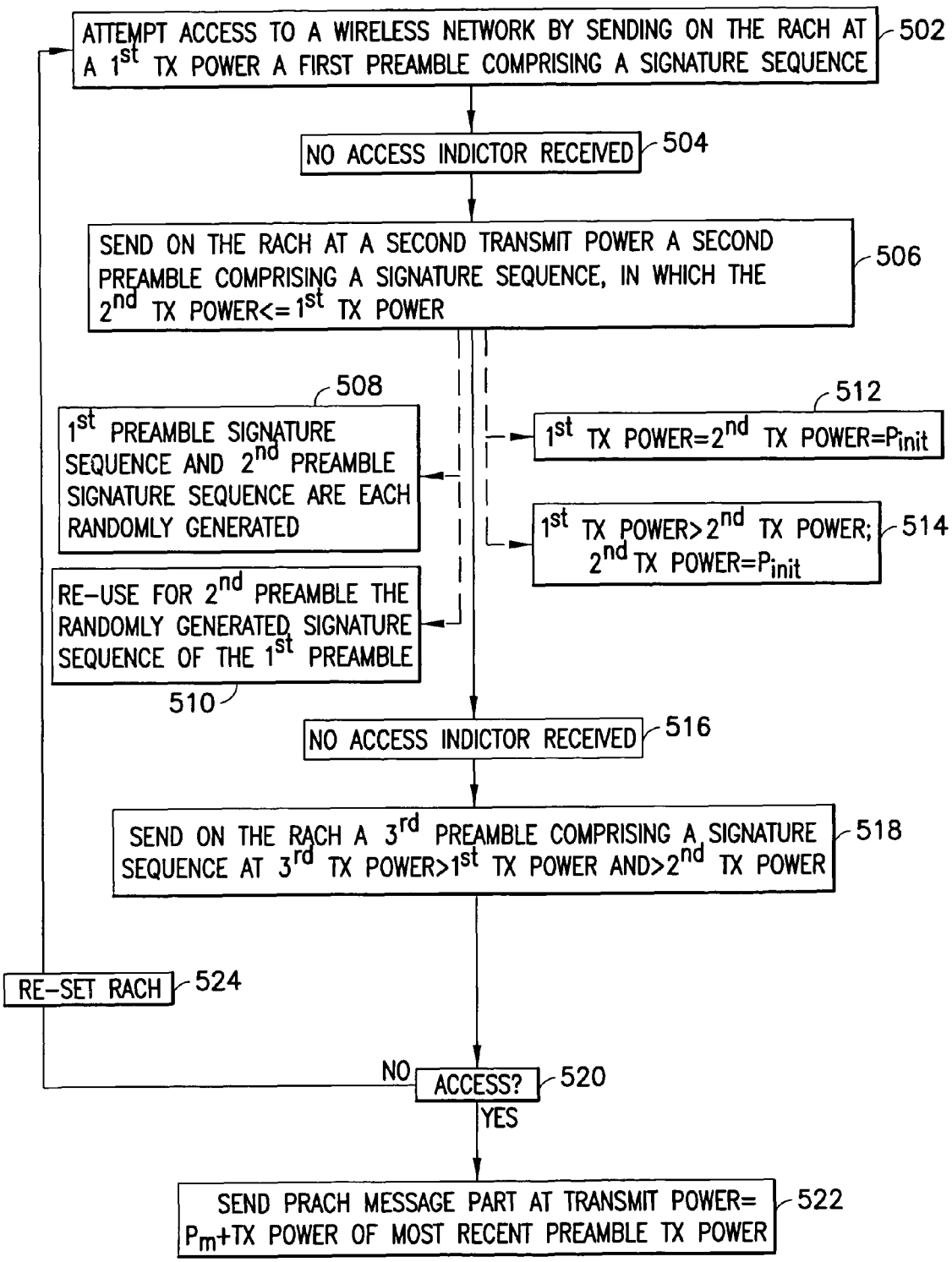
FIG. 5 is a logical flow diagram that illustrates the operation of a method, and the result of execution of computer program instructions by the data processor shown in FIGS. 6A-B according to exemplary embodiments of the invention.

FIG. 5 is a logical flow diagram that illustrates the operation of a method, and the result of execution of computer program instructions by the data processor shown in FIGS. 6A-B below according to various exemplary embodiments of the invention. FIG. 5 is not comprehensive of all the options detailed above but summarizes some major aspects of those embodiments for the reader's convenience. At block 502 the UE attempts access to a wireless network by sending on the random access channel at a first transmit power a first preamble comprising a signature sequence. This signature sequence is randomly selected from a set of signature sequences. Responsive to determining that the access attempt from sending the first preamble was unsuccessful, which at block 504 of FIG. 5 is by the UE failing to properly receive an AI at the AICH slot which maps from the sent first preamble, the UE at block 506 re-attempts access to the wireless network by sending on the random access channel at a second transmit power a second preamble comprising a signature sequence, in which the second transmit power is no greater than the first transmit power.

The dotted lines indicate various options for the different exemplary embodiments noted above. At block 508 the signature sequence of the first and second preambles are randomly generated, which extends to the signature sequences of all preambles of the RACH access attempt. At block 510, different from block 508, the signature sequence for the first preamble is re-used in all other preambles of the same RACH access attempt, and mapping of the signature sequence to the AICH slot is done once and stored in the UE's local memory. At block 512 the first and second transmit powers are equal, and set to the initial RACH power indicated by higher layers. Different from block 512, at block 514 the first transmit power is greater than the second transmit power, and it is the second transmit power that is set to the initial RACH power indicated by higher layers. Note that these dotted line blocks may be used in various combinations, block 508 can be combined with either block s 512 or 514, and block 510 can be also combined with either block s 512 or 514.

Assuming the UE determines that the access re-attempt from sending the second preamble was unsuccessful, which FIG. 5 shows at block 516 as the UE failing to receive an AI at the AICH slot which maps from the second preamble, then responsive to that determining the UE at block 518 again re-attempts access to the wireless network by sending on the random access channel at a third transmit power a third preamble comprising a signature sequence, in which the third transmit power is greater than the first transmit power and greater than the second transmit power. The signature sequences of the third preamble may be randomly generated as at block 508, or re-used from the first preamble as at block 510.

At block 510 there is a decision based on whether the UE finds an AI on the AICH slot that maps from the third preamble. If there is an AI there, the UE gets access to the network and sends at block 522 the PRACH message part at a transmit power that is increased by $P_m$ over the transmit power for the most recently transmitted preamble (third preamble in this example). If there is no AI there, the UE re-sets its RACH counter at block 524 and begins again at block 502 for its second RACH access attempt. It is understood from FIG. 5 that the RACH counter has a maximum of three for this example, and that each time the UE sends a new preamble within a RACH access attempt it increments its RACH counter by one.

Figure 6A:
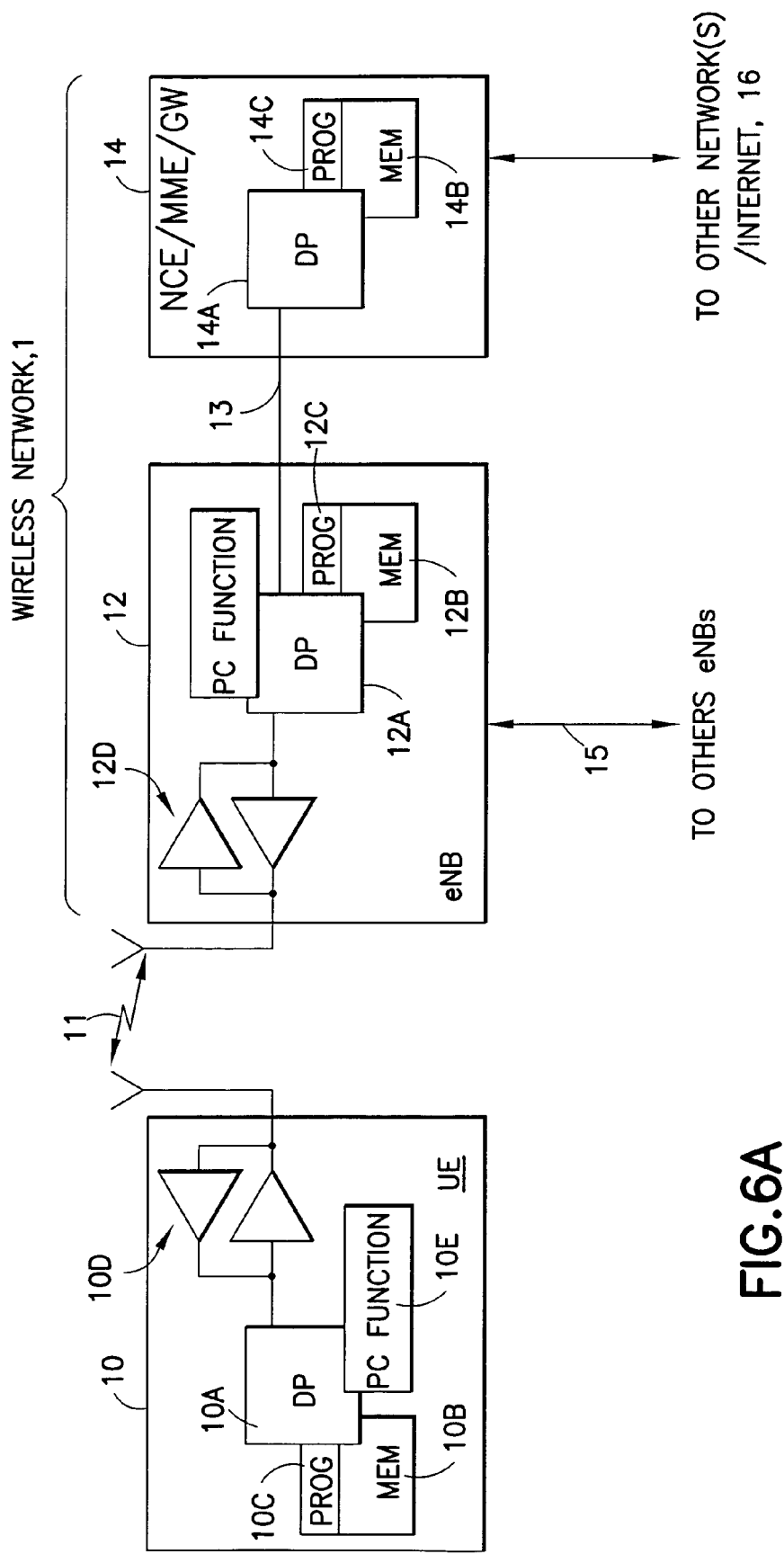
FIG. 6A shows a simplified block diagram of various electronic devices that are suitable for use in practicing the exemplary embodiments of this invention.

Reference is now made to FIG. 6A for illustrating a simplified block diagram of various electronic devices that are suitable for use in practicing the exemplary embodiments of this invention. In FIG. 6A a wireless network 1 is adapted for communication with an apparatus, such as a mobile communication device which may be referred to as a UE 10, via a network access node, such as a Node B (base station). The network 1 may include a network control element (NCE) 14 that may be embodied as a MME/S-GW (serving gateway) or a radio network controller RNC or other higher network element, and which provides connectivity with a broader network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D for bidirectional wireless communications over links 11 with the access node 12, which also includes a DP 12A, a MEM 12B that stores a PROG 12C, and a suitable RF transceiver 12D. The access node 12 is coupled via a data path 13 to the NCE 14. Another data interface 15 may be present for coupling to another access node (not shown) of the same type network 1. At least the PROG 10C and/or 12C may be assumed to include program instructions that, when executed by the associated DP 10A and 12A, enable the electronic device to operate in accordance with the exemplary embodiments of this invention, as detailed above and in the process diagram of FIG. 5.

The exemplary embodiments of this invention may be implemented at least in part by computer software executable by the DP 10A of the UE 10, or by hardware, or by a combination of software and hardware (and firmware).

For the purposes of describing the exemplary embodiments of this invention the UE 10 may be assumed to also include a power control PC functional unit 10E, and the network access node 12 of the first network 1 also includes a PC functional unit 12E. The PC functional units 10E, 12E, which may be in embodied as software stored in the MEM 10B, 12B, or as circuitry or some combination of computer software and hardware (and firmware), are assumed to be constructed and operated in accordance with the exemplary embodiments of this invention. These PC units 10E, 12E determine the transmit power for the various preambles according to the power-control aspects of the invention. These PC units 10E, 12E may also control how the signature sequences are constructed for the various preambles according to the signature sequence aspects of the invention.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Typically there will be a plurality of UEs 10 serviced by the network access node 12. The UEs 10 may or may not be identically constructed, but in general are all assumed to be electrically and logically compatible with the relevant network protocols and standards needed for operation in the wireless network 1.

Figure 6B:
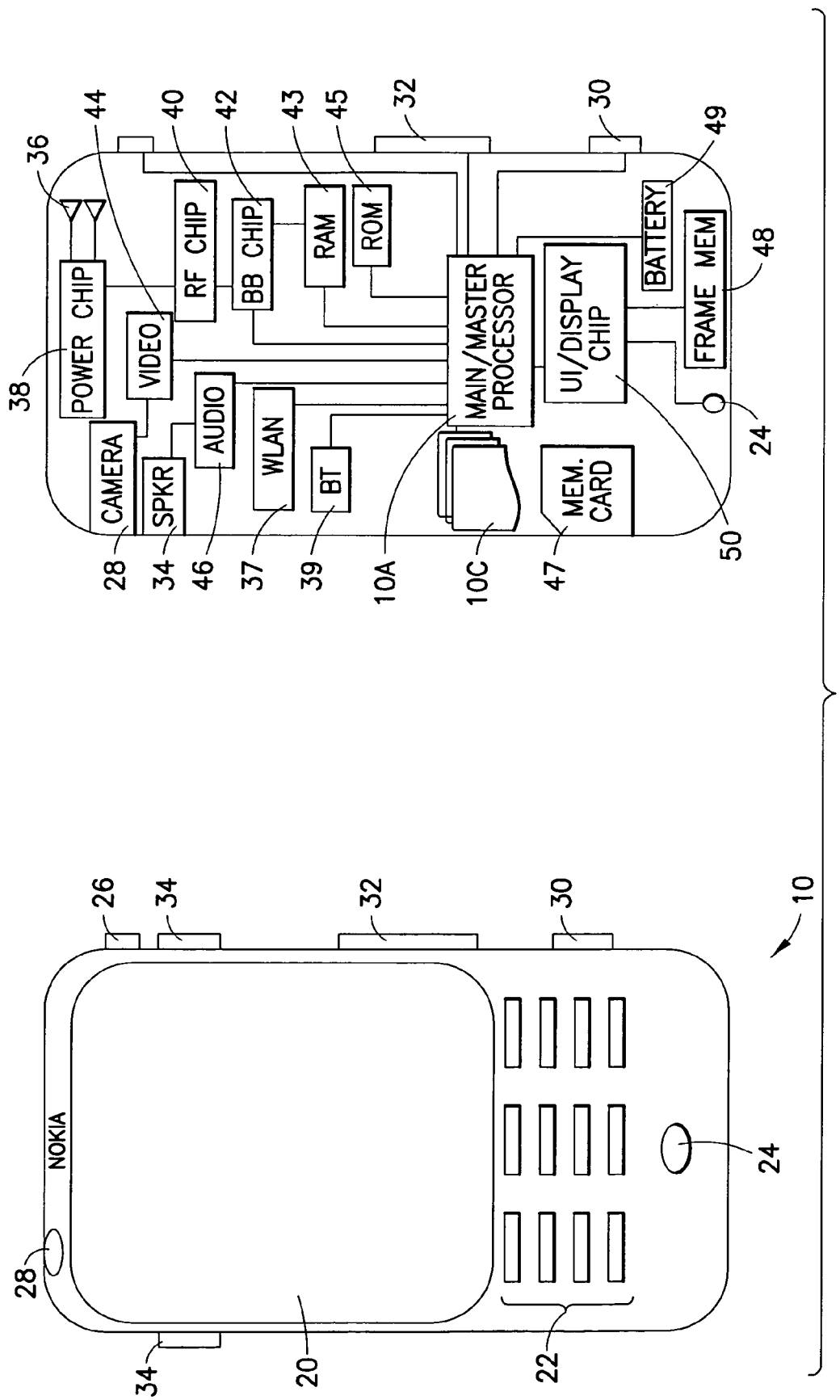
FIG. 6B is a more particularized block diagram of a user equipment such as that shown at FIG. 6A.

FIG. 6B illustrates further detail of an exemplary UE in both plan view (left) and sectional view (right), and the invention may be embodied in one or some combination of those more function-specific components. At FIG. 6B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 6B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. Embodiments of this invention are most relevant to the baseband chip 42, though it is noted that other embodiments need not be disposed there but may be disposed across various chips and memories as shown or disposed within another processor that combines some of the functions described above for FIG. 6B. Any or all of these various processors of FIG. 6B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 2B.

Note that the various chips (e.g., 38, 40, 42, etc.) that were described above may be combined into a fewer number than described and, in a most compact case, may all be embodied physically within a single chip.

Note that the various blocks shown in FIG. 5 are directed toward the UE 10, and may be viewed as method steps, and/or as operations that result from operation of computer program code, and/or as a plurality of coupled logic circuit elements constructed to carry out the associated function(s). Consistent with these teachings, similar functionality resides in the network access node to receive the UE-sent messages and to send those messages that FIG. 5 shows as the UE receiving, as well as the power values indicated by higher layers such as $P_{init}$, $P_0$, and $P_m$.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. For example, certain steps shown in FIG. 3 may be executed in other than the order shown, and certain of the computations described may be performed in other ways. However, all such and similar modifications of the teachings of this invention will still fall within the scope of this invention.

Further, while the exemplary embodiments have been described above in the context of the WCDMA system, it should be appreciated that the exemplary embodiments of this invention are not limited for use with only this one particular type of wireless communication system, and that they may be used to advantage in other types of wireless communication systems such as for example the LTE (E-UTRAN) system, which uses protocol similar to WCDMA for random access procedures. Other exemplary but non-limiting wireless systems include GSM. Relevant specifications for the LTE system begins with series 36, but otherwise mirror the series 25 technical specifications for WCDMA noted above. Further, the various names used for the channels and described parameters (e.g. AICH, PRACH, signature sequence, CAZAC, etc.) are not intended to be limiting in any respect, as these channels and parameters may be identified by any suitable names in different wireless protocols and standards.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. For example, the power control features detailed above may be used in some embodiments of the invention without the signature sequence aspects of the invention, and vice versa. As such, the foregoing description should be considered as merely illustrative of the principles, teachings, examples and exemplary embodiments of this invention, and not in limitation thereof.

We claim:

1. A method comprising:
attempting access to a wireless network by sending from a transmitter on a random access channel at a first transmit power a first preamble comprising a signature sequence that is randomly selected from a set of signature sequences;
responsive to determining that the access attempt from sending the first preamble was unsuccessful, re-attempting access to the wireless network by sending from the transmitter on the random access channel at a second transmit power a second preamble comprising a signature sequence, in which the second transmit power is no greater than the first transmit power.

2. The method of claim 1, wherein:
the signature sequence of the first preamble and the signature sequence of the second preamble are each randomly selected from the set of signature sequences separately;
and wherein determining that the access attempt from sending the first preamble was unsuccessful comprises monitoring an acquisition channel of the wireless network and failing to find an acquisition indicator on the acquisition channel that corresponds to the sent first preamble.

3. The method according to claim 2, further comprising determining an initial transmit power from an indication obtained from higher layers, and wherein the first transmit power is equal to the second transmit power which is the determined initial power.

4. The method according to claim 2, wherein the second transmit power is an initial transmit power determined from an indication obtained from higher layers and the first transmit power is greater than the second transmit power.

5. The method according to claim 2, further comprising:
responsive to determining that the access re-attempt from sending the second preamble was unsuccessful, again re-attempting access to the wireless network by sending from the transmitter on the random access channel at a third transmit power a third preamble comprising a signature sequence, in which the third transmit power is greater than the first transmit power and greater than the second transmit power, and in which the signature sequences for the first, second and third preambles are each randomly selected from the set of signature sequences separately.

6. The method of claim 1, wherein:
the signature sequence of the first preamble is randomly selected from the set of signature sequences and the signature sequence of the second preamble is the same as the signature sequence of the first preamble;
and wherein determining that the access attempt from sending the first preamble was unsuccessful comprises monitoring an acquisition channel of the wireless network and failing to find an acquisition indicator on the acquisition channel that corresponds to the sent first preamble.

7. The method according to claim 6, further comprising determining an initial transmit power from an indication received from higher layers, and wherein the first transmit power is equal to the second transmit power which is the determined initial power.

8. The method according to claim 6, wherein the second transmit power is the determined initial power and the first transmit power is greater than the second transmit power.

9. The method according to claim 6, further comprising:
responsive to determining that the access re-attempt from sending the second transmit preamble was unsuccessful, again re-attempting access to the wireless network by sending from the transmitter on the random access channel at a third transmit power a third preamble comprising a signature sequence, in which the third transmit power is greater than the first transmit power and greater than the second transmit power, and in which the signature sequence of the third preamble is the same as the signature sequence of the first preamble and of the second preamble.

10. An apparatus comprising:
a transmitter configured to attempt access to a wireless network by sending on a random access channel at a first transmit power a first preamble comprising a signature sequence that is randomly selected from a set of signature sequences;
a processor configured to determine that the access attempt from the first preamble was unsuccessful, and responsive to such determining to cause the transmitter to re-attempt access to the wireless network by causing the transmitter to send on the random access channel at a second transmit power a second preamble comprising a signature sequence, in which the second transmit power is no greater than the first transmit power.

11. The apparatus according to claim 10, wherein the processor is configured to randomly select from the set of signature sequences the signature sequence of the first preamble and separately to randomly select from the set of signature sequences the signature sequence of the second preamble;
and wherein the processor is configured to determine that the access attempt from the first preamble was unsuccessful by tuning a receiver of the apparatus to monitor an acquisition channel of the wireless network and determining that no acquisition indicator that corresponds to the sent first preamble was received at the receiver on the acquisition channel.

12. The apparatus according to claim 11:
wherein the receiver is configured to receive from higher layers parameters for an initial power for random access; and
the apparatus further comprises a memory storing the received parameters;
and wherein the processor is further configured to determine from the parameters the initial power for random access, and wherein the first transmit power is equal to the second transmit power which is equal to the determined initial power.

13. The apparatus according to claim 11:
wherein the receiver is configured to receive from higher layers parameters for an initial power for random access; and
the apparatus further comprises a memory storing the parameters;
and wherein the processor is further configured to determine from the parameters the initial power for random access, and wherein the second transmit power is the initial power and the first transmit power is greater than the second transmit power.

14. The apparatus according to claim 11:
wherein the processor is configured to determine that the access re-attempt from the second preamble was unsuccessful, and responsive to such determining to cause the transmitter to again re-attempt access to the wireless network by causing the transmitter to send on the random access channel at a third transmit power a third preamble comprising a signature sequence, in which the third transmit power is greater than the first transmit power and greater than the second transmit power;
and wherein the processor is configured to randomly select from the set of signature sequences, separately, the signature sequence of the first, second and third preambles.

15. The apparatus according to claim 10, further comprising a memory,
wherein the processor is configured to randomly select from the set of signature sequences the signature sequence of the first preamble and to store the selected signature sequence in the memory;
and wherein the signature sequence of the second preamble is the selected signature sequence of the first preamble retrieved from the memory;
and wherein the processor is configured to determine that the access attempt from the first preamble was unsuccessful by tuning a receiver of the apparatus to monitor an acquisition channel of the wireless network and determining that no acquisition indicator that corresponds to the sent first preamble was received at the receiver on the acquisition channel.

16. The apparatus according to claim 15:
wherein the receiver is configured to receive from higher layers parameters for an initial power for random access; and
the apparatus further comprises a memory storing the parameters;
and wherein the processor is further configured to determine from the parameters the initial power for random access, and wherein the first transmit power is equal to the second transmit power which is equal to the initial power.

17. The apparatus according to claim 15:
wherein the receiver is configured to receive from higher layers parameters for an initial power for random access; and
the apparatus further comprises a memory storing the parameters;
and wherein the processor is further configured to determine from the parameters the initial power for random access, and wherein the second transmit power is the initial power and the first transmit power is greater than the second transmit power.

18. The apparatus according to claim 15:
wherein the processor is configured to determine that the access re-attempt from the second preamble was unsuccessful, and responsive to such determining to cause the transmitter to again re-attempt access to the wireless network by causing the transmitter to send on the random access channel at a third transmit power a third preamble comprising a signature sequence, in which the third transmit power is greater than the first transmit power and greater than the second transmit power;
and wherein the signature sequence of the third preamble is the selected signature sequence of the first preamble retrieved from the memory.

19. A non transitory computer readable memory storing a program of instructions that when executed by a processor result in actions comprising:
attempting access to a wireless network by sending on a random access channel at a first transmit power a first preamble comprising a signature sequence that is randomly selected from a set of signature sequences;
responsive to determining that the access attempt from sending the first preamble was unsuccessful, re-attempting access to the wireless network by sending on the random access channel at a second transmit power a second preamble comprising a signature sequence, in which the second transmit power is no greater than the first transmit power.

20. A non transitory computer readable memory of claim 19, wherein:
the signature sequence of the first preamble is randomly selected from the set of signature sequences and the signature sequence of the second preamble is the same as the signature sequence of the first preamble, retrieved from a memory.

* * * * *